Aug. 1, 1950

C. A. OLCOTT 2,517,409

UNLOADER ARRANGEMENT FOR CENTRIFUGAL SEPARATORS

Filed Oct. 12, 1946

INVENTOR.
CHARLES A. OLCOTT
BY Hugh S. Wertz

ATTORNEY

Aug. 1, 1950 — C. A. OLCOTT — 2,517,409
UNLOADER ARRANGEMENT FOR CENTRIFUGAL SEPARATORS
Filed Oct. 12, 1946 — 2 Sheets-Sheet 2

INVENTOR.
CHARLES A. OLCOTT
BY Hugh S. Wertz
ATTORNEY

Patented Aug. 1, 1950

2,517,409

UNITED STATES PATENT OFFICE 2,517,409

UNLOADER ARRANGEMENT FOR CENTRIFUGAL SEPARATORS

Charles A. Olcott, West Milford, N. J.

Application October 12, 1946, Serial No. 702,949

4 Claims. (Cl. 210—70)

This invention relates to sugar centrifugal machines and more specifically to unloader arrangements for such machines.

It is an object of this invention to provide improved means for controlling the unloading of centrifugal machines.

Patent 1,342,405, issued June 1, 1920, to E. D. Mackintosh, discloses a centrifugal machine for processing sugar in which a centrifugal basket is driven by a multispeed electric motor through a friction clutch, the low speed drive of which exceeds a proper unloading speed—which is about 30 R. P. M. Associated with the basket is an unloader mechanism including a plow which bites into the sugar wall built up on the inside of the basket during the centrifuging process. The drag of the unloader plow on the sugar causes the friction clutch to slip and thus reduces the speed of the basket to one suitable for unloading. Arrangements of the type shown in the Mackintosh patent have been used fairly generally throughout the sugar industry and it has been found in practice that if the basket showed any sign of speeding up during the unloading operation, the operator can turn the handle (which operates the vertical movement of the plow) more rapidly, causing the plow to move down more rapidly and take a bigger cut from the sugar wall, thus imposing an additional drag on the basket and tending to cause it to slow down and thus counteract the tendency of the drive to speed it up. Hence, by means of the handle and the rate of movement thereof, the operator can control the speed of the basket during the time that the plow is moving down the basket wall and cutting out the sugar. The operation had a disadvantage, however, due to the fact that the control was not complete during the time that the plow was being introduced into the sugar, that is, during the time it takes to cut through the sugar wall to the inner surface of the basket. What control there was during this period in which the plow was being introduced was obtained by the operator using his physical strength to force the plow into the sugar by swinging the plow in a horizontal direction until it engages the sugar. To do this, he pulled hard on the handle toward him, but not in a way to rotate the crank, and thus by main force dragged the plow into the sugar. This usually took a pretty good size bite out of the sugar and tended to stall the basket, so, to counteract this tendency, the operator usually performed this operation with the basket rotating somewhat too fast for unloading, the momentum helping to take the first cut which is a large one. (After the introduction of the plow into the sugar, the unloading proceeded in the manner described above.) This brute force method of introducing the plow into the sugar sometimes caused breakage of the plow or of the fibre plow tip, or caused damage to the thin basket wall or screen. It was hard work and required skill and judgment on the part of the operator.

It is another object of this invention to more efficiently control the speed of the basket during the period of introducing the plow into the sugar wall.

It is still another object of this invention to provide a single, manually controlled means for moving the plow in such a manner that a proper drag is placed on the basket, and a proper speed of unloading thereby maintained, during both the period of introducing the plow into the sugar and the period during which the plow is moved downward while against the basket screen to scrape the sugar out.

In accordance with the invention, these and related objects are attained by providing, in an illustrative embodiment, a plow which has a tail portion having a helix angle of substantially 60 degrees which slides in a groove in a stationary bracket mounted on the top of the basket casing. (A helix angle is that angle with respect to the horizontal that a straight line makes when wrapped around the periphery of a cylinder in the form of a helix.) In operation, the operator moves the plow toward the sugar, as in the prior art arrangement described above, but before it reaches the sugar he starts turning the crank which moves the plow downward. As the plow moves downward the tail engages the groove and forces the plow tip toward the sugar and into it. At first this takes a light cut but the more rapidly the handle is turned, the deeper the cut that will be taken, and this continues until the tail by its engagement with the groove, forces the plow tip all the way over to the side of the basket, having cut all the way through the sugar. Thus complete control can be obtained during the introduction as well as during the scraping process. Moreover, the arrangement in accordance with this invention saves much wear and tear on the keys and keyways used in fastening the plow to the vertical rack and the rack to the frame.

The invention will be more readily understood by referring to the following description taken in connection with the accompanying drawings forming a part thereof, in which.

Figure 1:
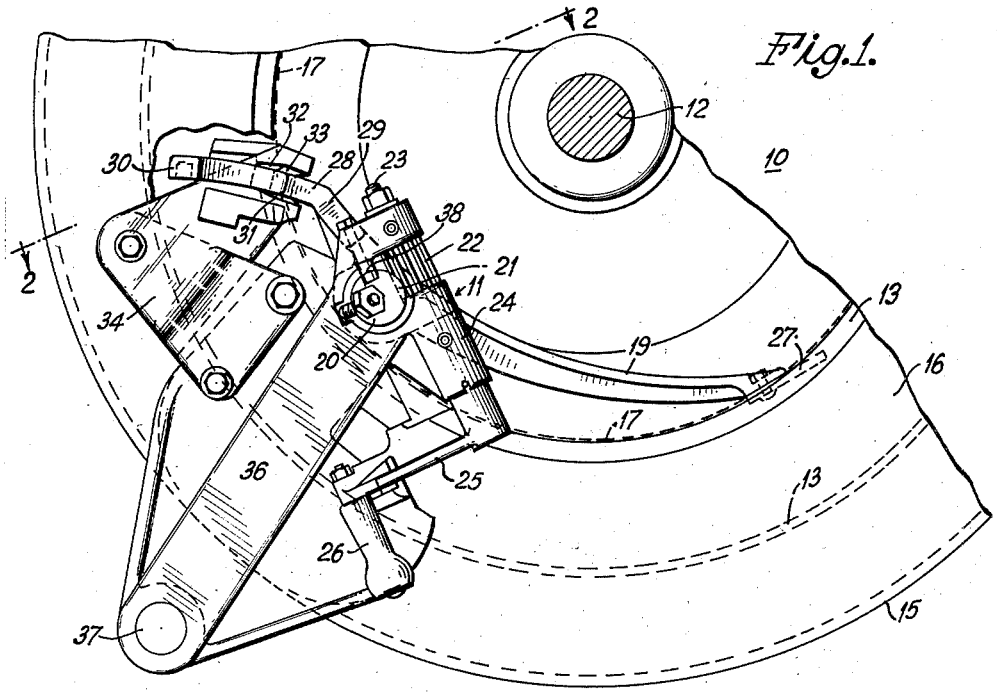
Fig. 1 is a plan view, partly in cross-section, of a portion of a centrifugal basket and an unloader arrangement in accordance with the invention.
Figure 2:
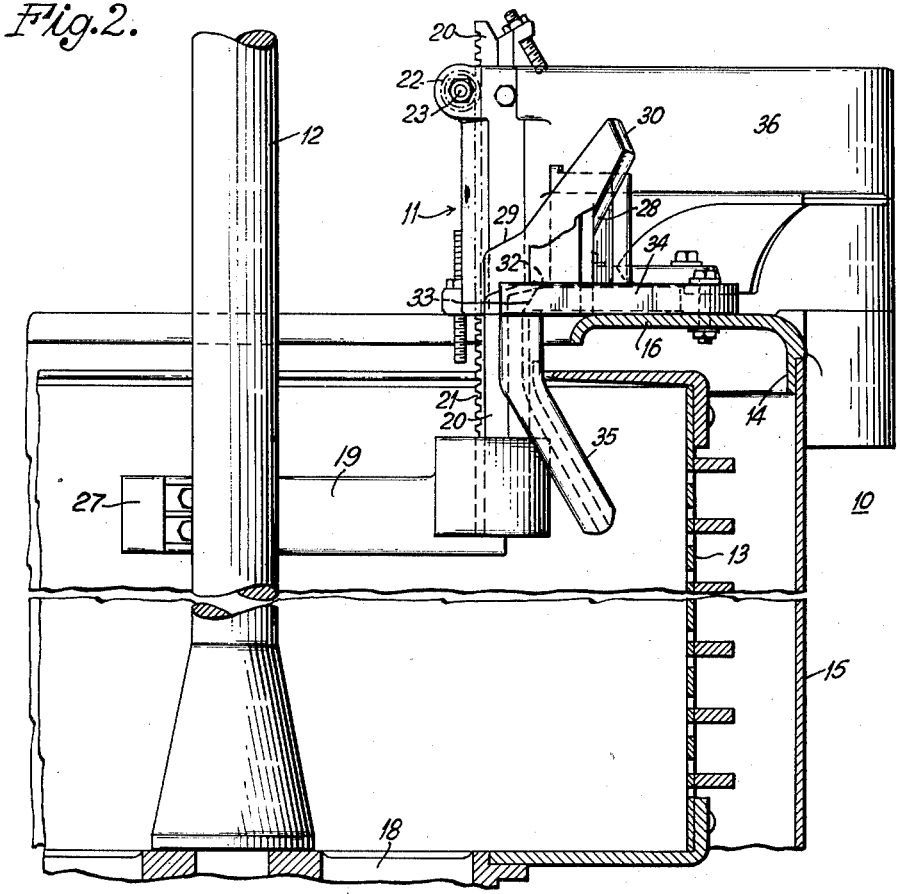
Fig. 2 is a vertical section of the arrangement of Fig. 1 taken through line 2—2 of that figure.

Referring more specifically to the drawings, Figs. 1 and 2 show, by way of example for illustrative purposes, a sugar centrifugal 10 having an unloader arrangement 11 in accordance with the invention. The centrifugal comprises a rotatable vertical shaft or spindle 12 adapted to be driven by any suitable means such as an electric or hydraulic motor (not shown) mounted above it. Suspended from the spindle is a perforated basket 13 having a stationary outer casing or curb 14. This curb has a cylindrical side wall 15, a top 16 and a bottom (not shown) which can be provided, in a manner well-known, with suitable annular troughs to carry away the various liquids ejected from the basket 13 during the centrifuging process. As is well-known, massecuite or magma is placed in the basket and the latter is rotated at high speed for several minutes causing green syrup to be thrown through the apertures in the basket, striking the curb wall and flowing down its sides to the annular troughs below. Washing fluid can then be introduced and the wash syrup (possibly mixed with a little green syrup) is also caused to strike the curb wall and is collected below. This centrifuging process leaves a wall of sugar grains (represented by the dashed-line circle 17 in Fig. 1) on the inside of the basket 13. In order to remove this sugar and permit it to pass through a central opening 18 in the bottom of the basket (which opening is covered during the centrifuging process), a plow 19 is provided. This plow is fastened and keyed to the lower portion of a vertical shaft or rack 20 which has teeth 21 cut therein. These teeth mesh with those of a gear 22 mounted on a shaft 23. This shaft is mounted on an arm 24 of the frame 36 and can be turned by a crank 25 having a handle 26. The frame 36 pivots about shaft 37 making it possible to move the plow 19 into the sugar wall 17. To prevent rotation of the vertical shaft 20 with respect to the arm 24 during the plowing and at other times, a key 38 is provided so that as the shaft 20 is moved up and down, it slides up and down on this key.

Figure 4:
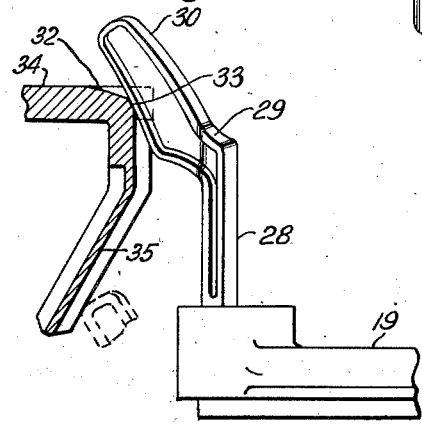
Fig. 4 is a detail view (also with certain portions omitted) showing the unloader plow in a position it occupies when it is engaging the sugar in the basket, in which position the tail of the plow is contacting the steep-slope portion of the groove in the bracket.
Figure 5:
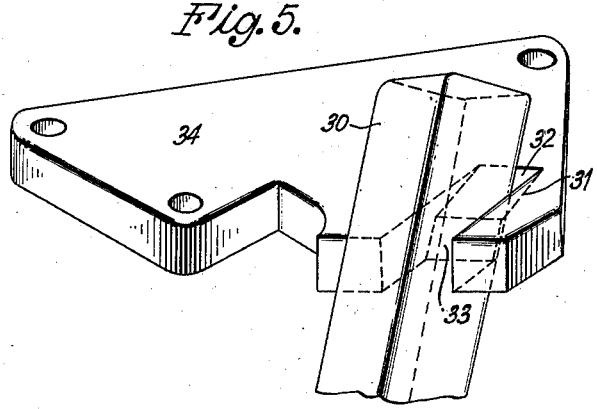
Fig. 5 is a fragmentary schematic perspective view showing a portion of the tail of the unloader and the bracket.
Figure 3:
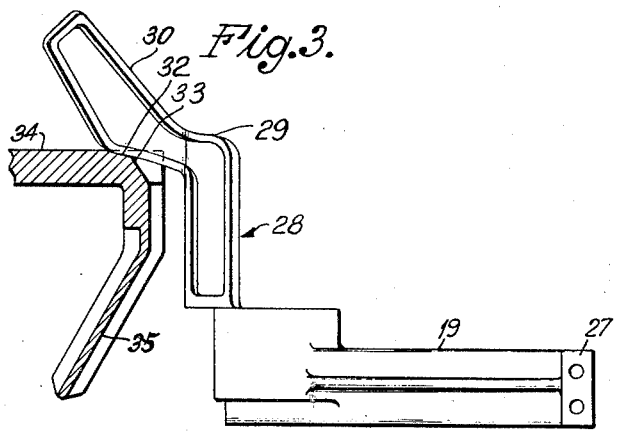
Fig. 3 is a detail view (with certain portions omitted for simplicity in the drawings) showing the unloader plow in a position it occupies when it is not operating, in which position the tail of the plow is contacting the shallow-slope portion of a groove in a guiding bracket mounted on the centrifugal basket casing.

The plow 19 has a cutting end 27 and a guiding end or tail 28 which has, as its terminus, a helically-curved tail portion 30 which makes with the horizontal a helix angle of substantially 60 degrees. (The radius of the cylinder about which the helix is formed is the distance from the axis of the shaft 37 to the tail portion 30.) The guiding end or tail 28 has a portion 29 which has a shallow slope and a portion 30 which has a steep slope. The tail is adapted to contact a groove 31 (having an upper portion 32 of shallow slope and a lower portion 33 of steep slope) in a stationary bracket member 34 which is fastened to the top 16 of the basket casing. An enlarged view of the bracket 34 and the end portion 30 of the tail 28 is shown in Fig. 5, while Figs. 3 and 4 show the plow 19 and the bracket member 34 in their relative positions when the plow is in the inoperative position and when it is engaging the sugar respectively. The bracket 34 has a downwardly extending portion 35 having its slope so arranged that if the operator tries to raise the plow 19 with the tip swung away from the side of the basket, the end of the plow tail will encounter this portion 35, forcing the plow towards the basket and preventing the end 30 of the plow tail 28 from catching the inside of the bracket 34. This, however, is not an essential portion of the invention and can be eliminated if desired.

The operation of the arrangement described above will now be described. After the sugar grains have been dried and it is desired to unload the basket, the operator starts the basket rotating slowly and then rotates crank 25, gradually causing the rack 20 to move downward, taking the plow 19 with it. The steep portion 30 of the tail 28 of the plow 19 engages the steep slope portion 33 of the groove 31 in the bracket 34 (as shown in Fig. 4) as the plow is being lowered, the engagement of the tail into the groove forcing the plow into the sugar. (On the other hand, when the unloader 11 is in the non-operating position with the plow tip 27 swung away from the sugar, then the shallow slope 29 of the tail 28 engages the shallow slope portion 32 of the groove 31, as shown in Fig. 3.) It is obvious that the sloping tail 28 of the plow 19 forces it away from the bracket 34 and thus has the effect of swinging the plow into engagement with the sugar. As the plow moves downward the plow tip 27 is forced deeper into the sugar wall 17. At first a light cut is taken but the more rapidly the handle 26 is turned, the deeper the cut that will be taken and this continues until the tail portion 30 by its engagement with the steep slope portion 33 of the groove 31 forces the plow all the way over to the side 13 of the basket, having cut all the way through the wall 17 of sugar. The tip 27 of the plow comes against the screen 13 at a distance below the basket top so that ordinarily as soon as the plow is all the way in, the operator first turns the handle 26 to raise the plow 19 to clean the sugar out from under the basket top, and then lowers it to scrape the sugar progressively from lower and lower portions of the basket. In these lower portions, the tail 28 slips completely away from the groove 31 but here it is no longer necessary to maintain contact between these two members since the plow is already against the screen 13.

It will thus be noted that the operator can control the speed of the basket during the period of introducing the plow in the same manner as he has already learned to do it with the old construction after the plow has penetrated to the screen. Thus if the drive tends to speed up the basket, he turns his handle more rapidly, forcing the plow tip into the sugar more rapidly, causing greater drag and thus offsetting the tendency of the drive to speed up the basket.

The unloader arrangement in accordance with this invention has other advantages. When the tip 27 of the plow engages the sugar, there is a tendency to rotate the plow with respect to the arm 24 and this is resisted by the key 38 in the arm and the key in the plow engaging the keyseats in the vertical rack 20. The push of the sugar against the tip of the plow is a force of some magnitude and in prior art arrangements this caused the keys and keyseats to wear and in time become loose so there was quite a little lost motion which would permit the tip of the plow to rotate with respect to the arm even though it was supposed to be held in alignment by the keys. This lost motion in some cases became so great as to permit the plow tip to swing toward the basket wall and catch in the sugar, causing an accident while the basket was running. Therefore, in order to keep the unloader safe, it has been necessary, prior to the present invention, to continuously check up on the keys and keyseats and replace worn parts fairly frequently. In the present arrangement employing a tail 28 on the plow, when the plow tip engages the sugar causing a tendency to twist the plow around, this tendency to twist is resisted by the tail which is of substantially heavy construction, thus relieving the load on the keys. This engagement of the tail with the groove 31 in the bracket 34 continues all during the period while the plow is being introduced into the sugar, which is the period during which it undergoes the greatest stress and tendency to twist. Of course, when the plow tip finally engages the basket wall, then the plow is supported at two points, at its tip and at the vertical shaft 29, and the tendency to twist ceases. Thus the addition of the tail adapted to engage the groove 31 relieves wear on the keys and greatly reduces the tendency to establish a lost motion. Moreover, when the plow of the present invention is in the non-operating position, its tail engages the shallow part 32 of the groove, and even if there should be a lost motion in the keys and keyseats, this engagement of the tail with the groove prevents the tip of the plow from swinging in towards the sugar wall, thus greatly minimizing the danger of accidents.

Various changes can made in the embodiment described above without departing from the spirit of the invention, the scope of which is indicated by the appended claims. Thus, instead of having a plow tail engage a groove in a stationary bracket, the same effect can be produced by having a tongue on the bracket engage a groove in the plow tail.

What is claimed is:

1. A centrifugal machine for drying sugar and the like comprising a stationary outer casing, an apertured basket within said casing adapted, when filled with moist sugar-bearing material, to be rotated to produce thereby a wall of dried sugar grains on the inside thereof, and apparatus for scraping the dried sugar grains from said basket comprising a plow member having a cutting end and a guiding end remote from said cutting end, a vertical shaft attached to said plow member between said two ends, manually controlled means supported from said outer casing for raising and lowering said vertical shaft in said basket thereby producing a corresponding vertical movement of the plow therein, and guiding means supported from said outer casing and shaped and positioned to cooperate with the guiding end of said plow member to produce at a controllable rate a horizontal component of motion to said plow by the vertical movement thereof during at least the first portion of the period consumed by said lowering of the vertical shaft but without causing rotation of the plow about said vertical shaft, said guiding end of said plow member including a tail portion sloped with respect to the horizontal and said guiding means including a member having a correspondingly sloped portion which makes a tongue and groove engagement with said sloped tail portion.

2. A centrifugal machine for drying sugar and the like comprising a stationary outer casing, an apertured basket within said casing adapted, when filled with moist sugar-bearing material, to be rotated to produce thereby a wall of dried sugar grains on the inside thereof, and apparatus for scraping the dried sugar grains from said basket comprising a plow member having a cutting end and a guiding end remote from said cutting end, a vertical shaft attached to said plow member between said two ends, manually controlled means supported from said outer casing for raising and lowering said vertical shaft in said basket thereby producing a corresponding vertical movement of the plow therein, and guiding means supported from said outer casing and shaped and positioned to cooperate with the guiding end of said plow member to produce at a controllable rate a horizontal component of motion to said plow by the vertical movement thereof during at least the first portion of the period consumed by said lowering of the vertical shaft but without causing rotation of the plow about said vertical shaft, said guiding end of said plow member including a tail portion sloped with respect to the horizontal and curved in the form of a section of a helix and said guiding means including a correspondingly sloped portion which makes a tongue and groove engagement with said sloped tail portion.

3. A centrifugal machine for drying sugar and the like comprising a stationary outer casing, an apertured basket within said casing adapted, when filled with moist sugar-bearing material, to be rotated to produce thereby a wall of dried sugar grains on the inside thereof, and apparatus for scraping the dried sugar grains from said basket comprising a plow member having a cutting end and a guiding end remote from said cutting end, a vertical shaft attached to said plow member between said two ends, manually controlled means supported from said outer casing for raising and lowering said vertical shaft in said basket thereby producing a corresponding vertical movement of the plow therein, and guiding means supported from said outer casing and shaped and positioned to cooperate with the guiding end of said plow member to produce at a controllable rate a horizontal component of motion to said plow by the vertical movement thereof during at least the first portion of the period consumed by said lowering of the vertical shaft but without causing rotation of the plow about said vertical shaft, said guiding end of said plow member including an inner tail portion sloped with respect to the horizontal and an outer tail portion having a greater slope with respect to the horizontal and curved in the form of a section of a helix and said guiding means including a member with two portions of different slope to cooperate with the two sloped portions of said guiding end of said plow member.

4. A centrifugal machine for drying sugar and the like comprising a stationary outer casing, an apertured basket within said casing adapted, when filled with moist sugar-bearing material, to be rotated to produce thereby a wall of dried sugar grains on the inside thereof, and apparatus for scraping the dried sugar grains from said basket comprising a plow member having a cutting end and a guiding end, remote from said cutting end, a vertical shaft attached to said plow member between said two ends, manually controlled means supported from said outer casing for raising and lowering said vertical shaft in said basket thereby producing a corresponding vertical movement of the plow therein, and guiding means supported from said outer casing and shaped and positioned to cooperate with the guiding end of said plow member to produce at a controllable rate a horizontal component of motion to said plow by the vertical movement thereof during at least the first portion of the period consumed by said lowering of the vertical shaft but without causing rotation of the plow about said vertical shaft, said guiding end of said plow member including a tail portion sloped substantially 60 degrees with respect to the horizontal and curved in the form of a section of a helix and said guiding means including a correspondingly sloped member which makes a tongue and groove engagement with said sloped tail portion.

CHARLES A. OLCOTT.

REFERENCES CITED

The following references are of record in the file of this patent:

UNITED STATES PATENTS

| Number | Name | Date |
| --- | --- | --- |
| 1,102,530 | Mackintosh | July 7, 1914 |
| 1,205,128 | Mackintosh | Nov. 14, 1916 |
| 1,431,016 | Mackintosh | Oct. 3, 1922 |
| 1,922,629 | Neuman | Aug. 15, 1933 |
| 2,064,766 | Roberts | Dec. 15, 1936 |
| 2,076,516 | Roberts | Apr. 6, 1937 |